(12) United States Patent
Song et al.

(10) Patent No.: US 12,437,423 B2
(45) Date of Patent: Oct. 7, 2025

(54) METHOD AND APPARATUS WITH TARGET OBJECT TRACKING

(71) Applicant: Samsung Electronics Co., Ltd., Suwon-si (KR)

(72) Inventors: Ju Hwan Song, Suwon-si (KR); Changbeom Park, Suwon-si (KR); Byung In Yoo, Suwon-si (KR); Dongwook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 18/352,636

(22) Filed: Jul. 14, 2023

(65) Prior Publication Data

US 2024/0221185 A1 Jul. 4, 2024

(30) Foreign Application Priority Data

Dec. 29, 2022 (KR) .......................... 10-2022-0189388

(51) Int. Cl.
*G06T 7/246* (2017.01)
*G06T 3/4046* (2024.01)
*H04N 23/60* (2023.01)

(52) U.S. Cl.
CPC ............ *G06T 7/248* (2017.01); *G06T 3/4046* (2013.01); *H04N 23/60* (2023.01); *G06T 2207/20084* (2013.01)

(58) Field of Classification Search
CPC .................. G06T 7/248; G06T 3/4046; G06T 2207/20084; G06T 7/251; G06T 3/40; G06T 7/11; H04N 23/60; H04N 23/67; H04N 23/69; G06N 3/0464; G06V 10/761

See application file for complete search history.

(56) References Cited

U.S. PATENT DOCUMENTS

| | | | | |
|---|---|---|---|---|
| 2020/0380274 | A1* | 12/2020 | Shin | ........................ G06T 1/20 |
| 2021/0081698 | A1* | 3/2021 | Lindeman | .......... G06Q 30/0283 |
| 2021/0117984 | A1* | 4/2021 | Sharma | .............. G06Q 30/0185 |
| 2021/0142479 | A1* | 5/2021 | Phogat | .................. G06T 11/206 |

(Continued)

FOREIGN PATENT DOCUMENTS

| | | |
|---|---|---|
| CN | 111797716 A | 10/2020 |
| KR | 10-2022-0133567 A | 10/2022 |

OTHER PUBLICATIONS

Guo et al. "Single Path One-Shot Neural Architecture Search with Uniform Sampling" *Computer Vision-ECCV 2020: 16th European Conference*, Glasgow, UK, Aug. 23-28, 2020, Proceedings, Part XVI 16. Springer International Publishing, Jul. 8, 2020 (pp. 1-16).

(Continued)

*Primary Examiner* — Tracy Y. Li
(74) *Attorney, Agent, or Firm* — NSIP Law

(57) ABSTRACT

A processor-implemented method with target object tracking includes: setting a search area for a target object included in an input image based on a position of a first target box in a template image; selecting a network path from a plurality of network paths of a neural network model according to a resizing ratio of a size of another image that is input to the neural network model to a size of the search area; and tracking the target object by estimating a position of a second target box corresponding to the target object in the input image according to the selected network path.

20 Claims, 13 Drawing Sheets

(56) References Cited

U.S. PATENT DOCUMENTS

2021/0390704 A1* 12/2021 Fujimoto ............... G06V 10/82
2023/0274453 A1* 8/2023 Tang ................... G06V 40/166
348/42
2023/0401826 A1* 12/2023 Guo ....................... G06V 10/82

OTHER PUBLICATIONS

Yan et al. "LightTrack: Finding Lightweight Neural Networks for Object Tracking via One-Shot Architecture Search" *Proceedings of the IEEE/CVF Conference on Computer Vision and Pattern Recognition*. 2021 (pp. 15180-15189).

Zhang et al. "Learn to Match: Automatic Matching Network Design for Visual Tracking" *Proceedings of the IEEE/CVF International Conference on Computer Vision*. 2021 (pp. 13339-13348).

Cheng et al. "SiamMixer: A Lightweight and Hardware-Friendly Visual Object-Tracking Network" *Sensors* vol. 22 Issue 4. Feb. 18, 2022 (pp. 1-15).

Liu et al. "A ConvNet for the 2020s" *Proceedings of the IEEE/CVF conference on computer vision and pattern recognition*. Mar. 2, 2022 (pp. 1-15).

Lin et al. "SwinTrack: A Simple and Strong Baseline for Transformer Tracking" *Advances in Neural Information Processing Systems* vol. 35. Oct. 13, 2022 (pp. 1-22).

* cited by examiner

METHOD AND APPARATUS WITH TARGET OBJECT TRACKING

CROSS-REFERENCE TO RELATED APPLICATIONS

This application claims the benefit under 35 USC § 119(a) of Korean Patent Application No. 10-2022-0189388, filed on Dec. 29, 2022 in the Korean Intellectual Property Office, the entire disclosure of which is incorporated herein by reference for all purposes.

BACKGROUND

1. Field

The following disclosure relates to a method and apparatus with target object tracking.

2. Description of Related Art

Object tracking may correspond to a task of memorizing position and size information of an object included in an image frame and finding a position of the object in a subsequent image frame. Due to the characteristics of deep learning that uses a fixed network, the size of an image input to the network may always be the same. For example, the size of an image input to an object tracking network may be predetermined, but in the process of resizing an image to match the predetermined size, image information may be inevitably lost or changed, which may negatively affect the tracking performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method with target object tracking includes: setting a search area for a target object included in an input image based on a position of a first target box in a template image; selecting a network path from a plurality of network paths of a neural network model according to a resizing ratio of a size of another image that is input to the neural network model to a size of the search area; and tracking the target object by estimating a position of a second target box corresponding to the target object in the input image according to the selected network path.

The selecting of the network path may include: determining the resizing ratio based on a value obtained by dividing the size of the other image by the size of the search area; and selecting a network path determined according to the resizing ratio from the plurality of network paths, according to a result of a comparison between the resizing ratio and a set threshold value.

The plurality of network paths may include blocks configured as convolutional layers respectively corresponding to different kernel sizes.

The selecting of the network path determined according to the resizing ratio may include: selecting a first network path corresponding to a first kernel size, in response to a determination that the resizing ratio is greater than the threshold value; selecting a second network path corresponding to a second kernel size, in response to a determination that the resizing ratio is equal to the threshold value; and selecting a third network path corresponding to a third kernel size, in response to the resizing ratio being less than the threshold value.

The second kernel size may be larger than the first kernel size, and the third kernel size may be larger than the second kernel size.

The neural network model may include a Super Net having separate convolutional layers configured for a plurality of kernel sizes.

The tracking of the target object may include: generating a second feature map from the search area resized according to the selected network path; and estimating the position of the second target box corresponding to the target object in the input image using a first feature map of the template image and the second feature map.

The estimating of the position of the second target box may include: determining a similarity between the first feature map and the second feature map; and estimating the position of the second target box corresponding to the target object in the input image based on the similarity.

The method may include storing the position of the second target box to set the search area in an input image subsequent to the input image.

In one or more general aspects, a non-transitory computer-readable storage medium stores instructions that, when executed by a processor, configure the processor to perform any one, any combination, or all of operations and/or methods described herein.

In one or more general aspects, an apparatus with target object tracking includes: one or more processors configured to: set a search area for a target object included in an input image based on the position of the first target box; select a network path from a plurality of network paths of a neural network model according to a resizing ratio of a size of another image that is input to the neural network model to a size of the search area; and track the target object by estimating a position of a second target box corresponding to the target object in the input image based on the selected network path.

For the selecting of the network path, the one or more processors may be configured to: determine the resizing ratio based on a value obtained by dividing the size of the other image by the size of the search area; and select a network path determined according to the resizing ratio from the plurality of network paths, according to a result of a comparison between the resizing ratio and a set threshold value.

The plurality of network paths may include blocks configured as convolutional layers respectively corresponding to different kernel sizes.

For the selecting of the network path determined according to the resizing ratio, the one or more processors may be configured to: select a first network path corresponding to a first kernel size, in response to the resizing ratio being greater than the threshold value; select a second network path corresponding to a second kernel size, in response to the resizing ratio being equal to the threshold value; and select a third network path corresponding to a third kernel size, in response to the resizing ratio being less than the threshold value.

The second kernel size may be larger than the first kernel size, and the third kernel size may be larger than the second kernel size.

The neural network model may include a Super Net having separate convolutional layers configured for a plurality of kernel sizes.

For the tracking of the target object, the one or more processors may be configured to: generate a second feature map from the search area resized according to the selected network path; and estimate the position of the second target box corresponding to the target object in the input image using the first feature map and the second feature map.

In one or more general aspects, an electronic device includes: a camera configured to capture either one or both of a template image and an input image; and one or more processors configured to: set a search area for a target object included in the input image based on a position of a first target box in the template image; select a network path from a plurality of network paths of a neural network model according to a resizing ratio of a size of another image that is input to the neural network model to a size of the search area; and perform either one or both of auto focusing and auto zooming on the target object by estimating a position of a second target box corresponding to the target object in the input image by resizing the search area according to the selected network path.

For the selecting of the network path, the one or more processors may be configured to: determine the resizing ratio between the size of the other image and the size of the search area; and select a network path determined according to the resizing ratio from the plurality of network paths, according to a result of a comparison between the resizing ratio and a set threshold value.

For the selecting of the network path determined according to the resizing ratio, the one or more processors may be configured to: select a first network path corresponding to a first kernel size, in response to the resizing ratio being greater than the threshold value; select a second network path corresponding to a second kernel size larger than the first kernel size, in response to the resizing ratio being equal to the threshold value; and select a third network path corresponding to a third kernel size larger than the second kernel size, in response to the resizing ratio being less than the threshold value.

Other features and aspects will be apparent from the following detailed description, the drawings, and the claims.

Figure 1:
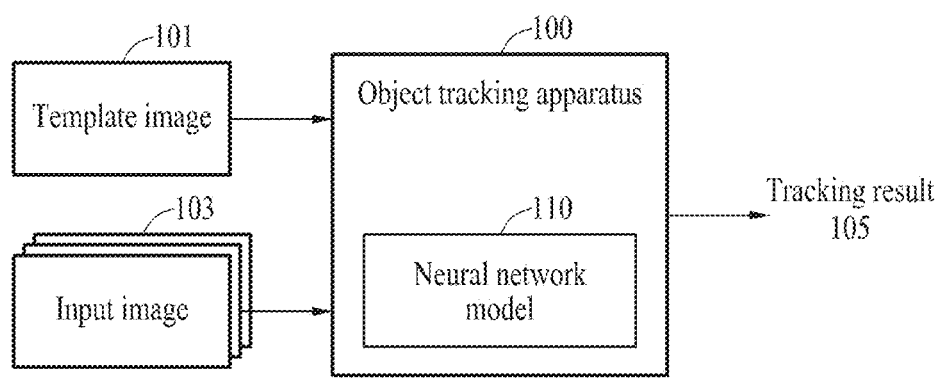
FIG. 1 illustrates an example of a configuration and operation of an apparatus with target object tracking.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of a configuration and operation of an apparatus with target object tracking. Referring to FIG. 1, an apparatus with target object tracking (hereinafter, the "object tracking apparatus") 100 may input a template image 101 and an input image 103 to a neural network model 110 and output a result of tracking a target object in the input image 103 (hereinafter, the "tracking result") 105.

The template image 101 and the input image 103 may correspond to a series of consecutive image frames. For example, the template image 101 may correspond to an image frame at a time t−2 or a time t−1 of a video file including a plurality of image frames. The input image 103 may correspond to at least one frame at a time t and/or a time t+1, following the image frame corresponding to the template image 101. The input image 103 may also be referred to as a "search image" in that it is an image to be searched to track a target object.

Alternatively or additionally, the template image 101 and the input image 103 may correspond to independent image files. For example, the input image 103 may correspond to a video file including a plurality of image frames. The template image 101 may correspond to a still image file related or unrelated to the video file.

In any case, the template image 101 may include a target object, and the object tracking apparatus 100 may generate the tracking result 105 by tracking the target object in the input image 103. The template image 101 and the input image 103 may correspond to an entire area or a partial area of a corresponding image frame.

The template image 101 may include information on the target object to be tracked in the input image 103. The "target object" may refer to an object to be tracked in an image. The target object may be, for example, a living thing such as a person, animal, or tree, or an inanimate object such as a vehicle, a building, or other objects. The information on the target object may include, for example, position information, color information, and/or texture information including brightness of the target object, but is not necessarily limited thereto.

In addition to the information on the target object, the template image 101 may include context information corresponding to a background. For example, when a square target box is applied to the target object of an elongated shape, the proportion of context information in the template image may increase. Here, the "target box" may correspond to a type of bounding box used to detect a target object. The position of the target object may be specified through position information (e.g., the x coordinate and y coordinate) of the bounding box and size information (e.g., the width and height) of the bounding box. The position and size of a search area of the input image 103 may be determined based on the position and size of the target box corresponding to the template image 101.

The object tracking apparatus 100 may track the target object by estimating the position of the target box corresponding to the target object in the input image 103 based on the information on the target object discerned through the template image 101. The tracking result 105 from the object tracking apparatus 100 may correspond to the position of the target object in the input image 103.

The object tracking apparatus 100 may generate the tracking result 105 using the neural network model 110. The neural network model 110 may be a machine learning-based artificial intelligence model. The neural network model 110 may include, for example, a deep neural network (DNN) including a plurality of layers. The plurality of layers may include an input layer, at least one hidden layer, and an output layer.

The DNN may include at least one of a fully connected network (FCN), a convolutional neural network (CNN), and/or a recurrent neural network (RNN). For example, at least a portion of the plurality of layers in the DNN may correspond to a CNN, and another portion thereof may correspond to a FCN. In this example, the CNN may be referred to as a convolutional layer, and the FCN may be referred to as a fully connected layer.

In the case of a CNN, data input into each layer may be referred to as an input feature map, and data output from each layer may be referred to as an output feature map. The input feature map and the output feature map may also be referred to as activation data. When a convolutional layer corresponds to an input layer, an input feature map to be input to the input layer may be an input image. An output feature map may be generated through a convolution operation between the input feature map and a weight kernel. The input feature map, the output feature map, and the weight kernel may be distinguished by a unit of a tensor.

A neural network may be trained based on deep learning, and then perform inference for the purpose of training by mapping, to each other, input data and output data that are in a nonlinear relationship. Deep learning may correspond to a machine learning technique for solving a problem such as image or speech recognition from a big data set. Deep learning may be construed as an optimization problem solving process of finding a point at which energy is minimized while training a neural network using prepared training data.

Through supervised or unsupervised learning of deep learning, a structure of the neural network or a weight corresponding to a model may be obtained, and the input data and the output data may be mapped to each other through the weight. If the width and the depth of the neural network are sufficiently great, the neural network may have a capacity sufficient to implement a predetermined function. The neural network may achieve an optimized performance when learning a sufficiently large amount of training data through an appropriate training process.

In the following, the neural network may be expressed as being trained "in advance", where "in advance" means before the operation of the neural network "starts". That the operation of the neural network "starts" means that the neural network is ready for inference and starts inference. For example, that the operation of the neural network "starts" may include that the neural network is loaded into a memory, or that input data for inference is input into the neural network after the neural network is loaded into the memory.

The object tracking apparatus 100 may input the template image 101 and the input image 103 to the neural network model 110 and obtain the tracking result 105 of tracking the target object as an output of the neural network model 110. The neural network model 110 may be trained in advance to output the tracking result 105 based on the input of the template image 101 and the input image 103. The neural network model 110 may include, for example, a Siamese network to be described later with reference to FIG. 8 below.

The size of data (e.g., an image) input to the neural network model 110 may be fixed, and a typical object tracking apparatus may inaccurately track various types of target objects when the input data is of the fixed input size. For example, the input of the neural network model 110 may have a square or a dimension close to a square.

The object tracking apparatus 100 may track the target object using the neural network model 110 including a Super Net having a plurality of kernel sizes. In contrast to the typical object tracking apparatus, the object tracking apparatus 100 of one or more embodiments may improve the object tracking accuracy for various sizes of objects by changing a network path used by the neural network model 110 according to a resizing ratio of an image input to the neural network model 110 (e.g., a resizing ratio of a first size of an image input to the neural network model (e.g., the size of the template image 101) to a second size of the search area in the input image 103).

Figure 2:
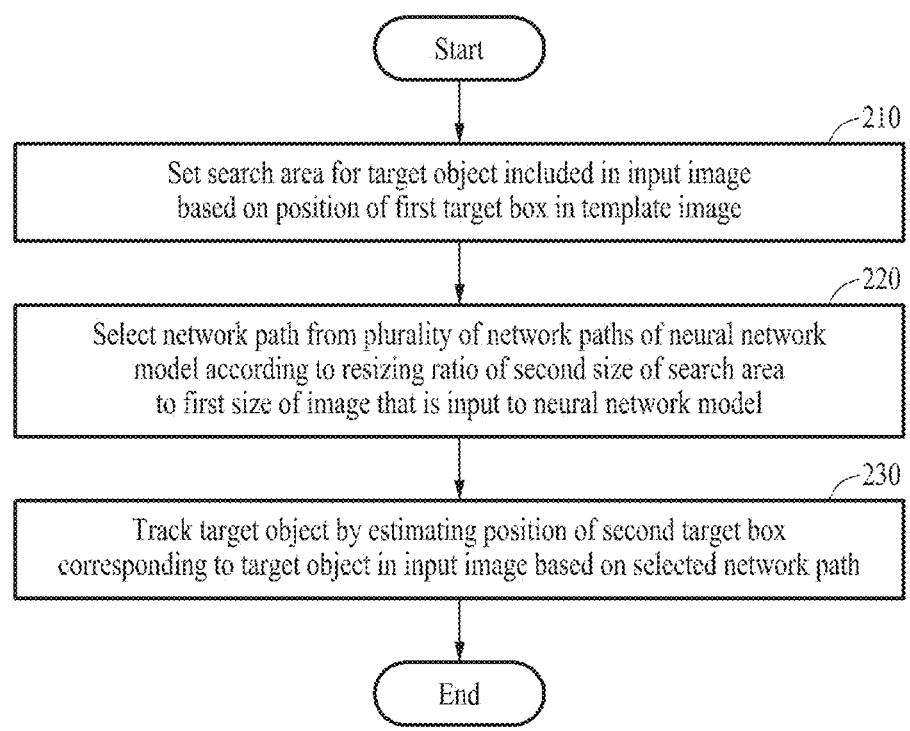
FIG. 2 illustrates an example of a method of tracking a target object.

FIG. 2 illustrates an example of a method of tracking a target object. Operations to be described hereinafter with reference to FIG. 2 may be performed sequentially, but not necessarily performed sequentially. For example, the order of the operations may be changed and at least two of the operations may be performed in parallel.

Referring to FIG. 2, an object tracking apparatus may track a target object through operations 210 to 230. The object tracking apparatus may be, for example, the object tracking apparatus 100 of FIG. 1, an object tracking apparatus 1100 of FIG. 11, or an electronic device 1200 of FIG. 12, but is not necessarily limited thereto.

In operation 210, the object tracking apparatus may set a search area for a target object included in an input image based on a position of a first target box in a template image. The "first target box" may correspond to a bounding box in which the target object is detected in the template image. The position of the first target box may be provided in the form of, for example, coordinates of two points in the template image. The object tracking apparatus may set, as the search area in the input image, an area expanded by a predetermined multiple (e.g., a factor of "2") horizontally and vertically from an area of the first target box based on the position of the first target box.

In operation 220, the object tracking apparatus may select a network path from a plurality of network paths of a neural network model according to a resizing ratio of a first size of an image that is input to the neural network model to a second size of the search area. The neural network model may include, for example, a Super Net having separate convolutional layers configured for a plurality of kernel sizes.

In operation 220, the object tracking apparatus may determine the resizing ratio based on a value obtained by dividing the first size of the image that is input to the neural network model by the second size of the search area. The object tracking apparatus may select a network path determined according to the resizing ratio from the plurality of network paths, according to a result of a comparison between the resizing ratio and a set threshold value. Here, "the plurality of network paths" may include blocks configured as convolutional layers respectively corresponding to different kernel sizes. An example of selecting a network path by the object tracking apparatus will be described in more detail below with reference to FIGS. 3, 4A, 4B, and 6.

In operation 230, the object tracking apparatus may track the target object by estimating a position of a second target box corresponding to the target object in the input image according to the network path selected in operation 220. The object tracking apparatus may generate a second feature map from the search area resized according to the network path selected in operation 220. In an example, the resized search area may correspond to an image of the search area resized with a resizing ratio corresponding to the selected network path.

The object tracking apparatus may estimate the position of the second target box corresponding to the target object in the input image using a first feature map of the template image and the second feature map. In an example, the first feature map of the template image may be generated by the neural network model 110 with respect to a previous input image (e.g., a previous image frame). An example of estimating the position of the second target box by the object tracking apparatus will be described in more detail below with reference to FIG. 5.

Figure 3:
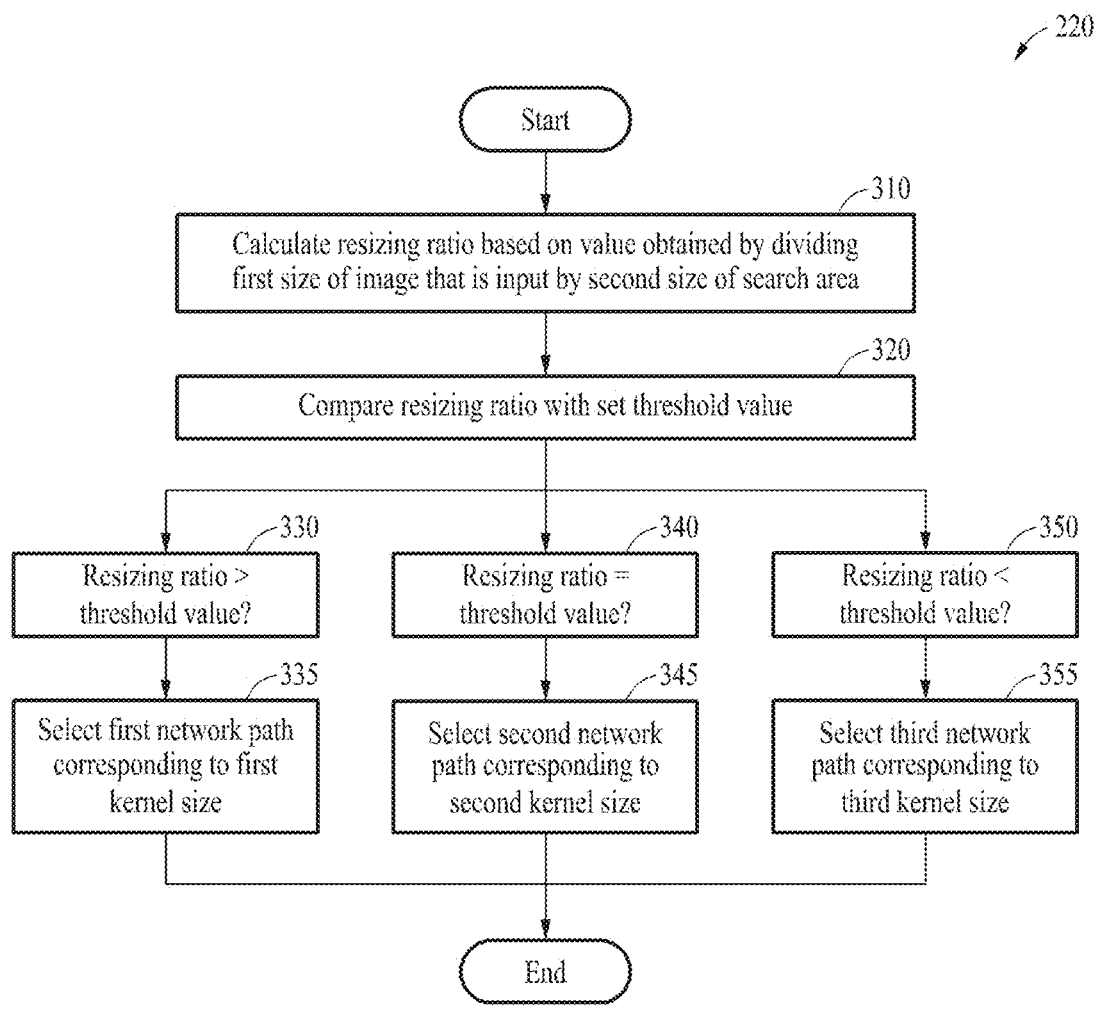
FIG. 3 illustrates an example of selecting a network path.

FIG. 3 illustrates an example of selecting a network path. Operations to be described hereinafter with reference to FIG. 3 may be performed sequentially, but not necessarily performed sequentially. For example, the order of the operations may be changed and at least two of the operations may be performed in parallel.

Referring to FIG. 3, an object tracking apparatus may track a target object through operations 310 to 355.

In operation 310, the object tracking apparatus may determine the resizing ratio based on a value obtained by dividing the first size of the image that is input to the neural network model by the second size of the search area.

In operation 320, the object tracking apparatus may compare the resizing ratio determined in operation 310 with a set threshold value. The threshold value may be, for example, "1", but is not necessarily limited thereto.

In operation 330, the object tracking apparatus may determine whether the resizing ratio is greater than the threshold value. In response to a determination in operation 330 that the resizing ratio is greater than the threshold value, the object tracking apparatus may select a first network path corresponding to a first kernel size, in operation 335. Here, that "the resizing ratio is greater than the threshold value" may correspond to, for example, a case where the second size of the search area (e.g., an image 415 of FIG. 4A) is smaller than the first size of the image that is input to the neural network model (e.g., an enlarged image 420 of FIG. 4A), as discussed below with reference to FIG. 4A.

In response to a determination in operation 330 that the resizing ratio is not greater than the threshold value, the object tracking apparatus may determine whether the resizing ratio is equal to the threshold value, in operation 340. In response to a determination in operation 340 that the resizing ratio is equal to the threshold value, the object tracking apparatus may select a second network path corresponding to a second kernel size, in operation 345. The second kernel size may be larger than the first kernel size.

In response to a determination in operation 340 that the resizing ratio is not equal to the threshold value, the object tracking apparatus may determine whether the resizing ratio is less than the threshold value, in operation 350. In response to a determination in operation 350 that the resizing ratio is less than the threshold value, the object tracking apparatus may select a third network path corresponding to a third kernel size, in operation 355. The third kernel size may be larger than the second kernel size. Here, that "the resizing ratio is less than the threshold value" may correspond to, for example, a case where the second size of the search area (e.g., an image 435 of FIG. 4B) is larger than the first size of the image that is input to the neural network model (e.g., an image 440 of FIG. 4B), discussed below with reference to FIG. 4B.

Hereinafter, with reference to FIGS. 4A and 4B, an example of selecting a network path according to the resizing ratio between the first size of the image that is input to the neural network model and the second size of the search area by the object tracking apparatus will be described in more detail.

Figure 4A:
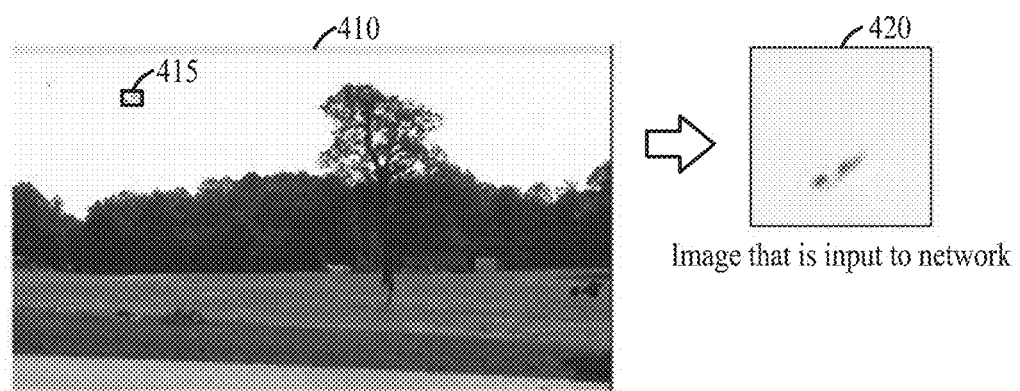
FIGS. 4A and 4B illustrate a case where a second size of a search area is larger than a first size of an image input to a neural network model and a case where the second size of the search area is smaller than the first size of the image input to the neural network model.

FIG. 4A illustrates a case in which a second size of a search area is smaller than a first size of an image that is input to a neural network model, and 4B illustrates a case in which the second size of the search area is larger than the first size of the image input to the neural network model.

As shown in FIG. 4A, a case of enlarging and using an image 415 of a small object corresponding to a search area in an actual input image 410 may correspond to a case of inputting an enlarged image 420 of a small target object included in the actual input image 410 to a neural network model.

Since the small size of the image was greatly increased in the case of enlarging the image 415 of the small object as in FIG. 4A, detailed information of the object included in the image 415 of the small object corresponding to the search area may be relatively insufficient. In an example, when the kernel size is great, errors of surrounding inaccurate pixels may accumulate and reduce the accuracy of image restoration. Therefore, the object tracking apparatus of one or more embodiments may increase the accuracy of image restoration by reducing the kernel size to narrowly search around the target object.

Therefore, as shown in FIG. 4A, when the image 415 of the small object is enlarged to the size of the enlarged image 420 and input to the neural network model, the object tracking apparatus of one or more embodiments may select a network path with a reduced kernel size to perform a convolution operation in a neural network model so as to more densely utilize pixel information. The object tracking apparatus may select, for example, a first network path corresponding to a small kernel size ("first kernel size"). In an example, the first kernel size may be "3", but is not necessarily limited thereto.

Figure 4B:
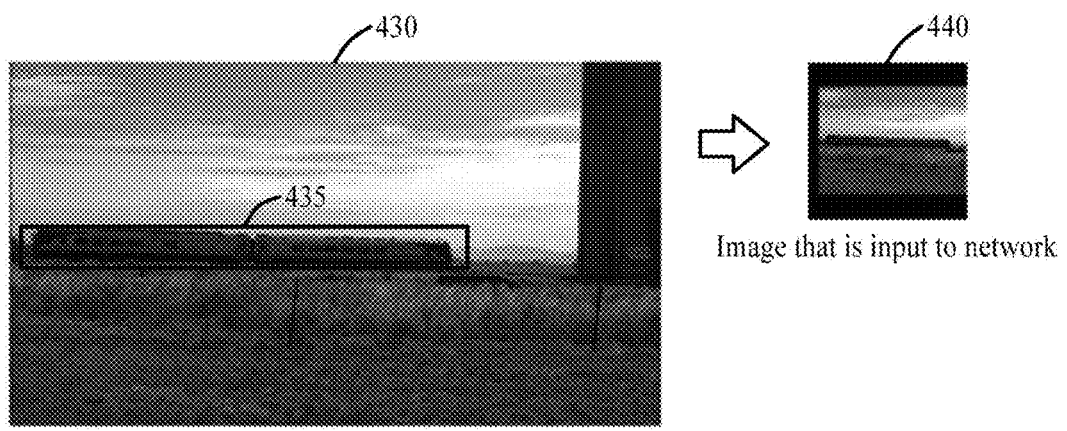

Alternatively, as shown in FIG. 4B, a case of reducing and using an image 435 of a large object corresponding to a search area in an actual input image 430 may correspond to a case of inputting an image 440 obtained by reducing the size of a large object in the actual input image 430 to a neural network model.

Since the large size of the image was greatly reduced in the case of reducing the image 435 of the large object as in FIG. 4B, detailed information of the object included in the image 435 of the large object corresponding to the search area may be greatly compressed, in other words, the detailed information may be enriched. In the case of convoluting an input image to a small size kernel, blank information on the outer boundary of the reduced image 440 may unnecessarily have a strong influence. In particular, when the target object is positioned adjacent to the outer boundary, image restoration accuracy may be reduced. In addition, although information is lost as the size of the image is reduced, information required by the network may still be included in the reduced image 440. Therefore, the object tracking apparatus of one or more embodiments may increase the accuracy of image restoration by using a large kernel to extract features of the target object during convolution, such that information of neighboring pixels may be more widely used.

As described above, when the image 435 of the large object is reduced to the reduced image 440 and input to the neural network model, the object tracking apparatus of one or more embodiments may select a network path with an increased kernel size to perform a convolution operation in a neural network model so as to more widely utilize information on surrounding pixels. The object tracking apparatus may select, for example, a third network path corresponding to a large kernel size ("third kernel size"). In an example, the third kernel size may be "7", but is not necessarily limited thereto.

An image of an object may be directly input to a neural network model without reduction or enlargement. In an example, the object tracking apparatus may select a second network path corresponding to a second kernel size larger than the first kernel size and smaller than the third kernel size. In an example, the second kernel size may be "5", but is not necessarily limited thereto.

Figure 5:
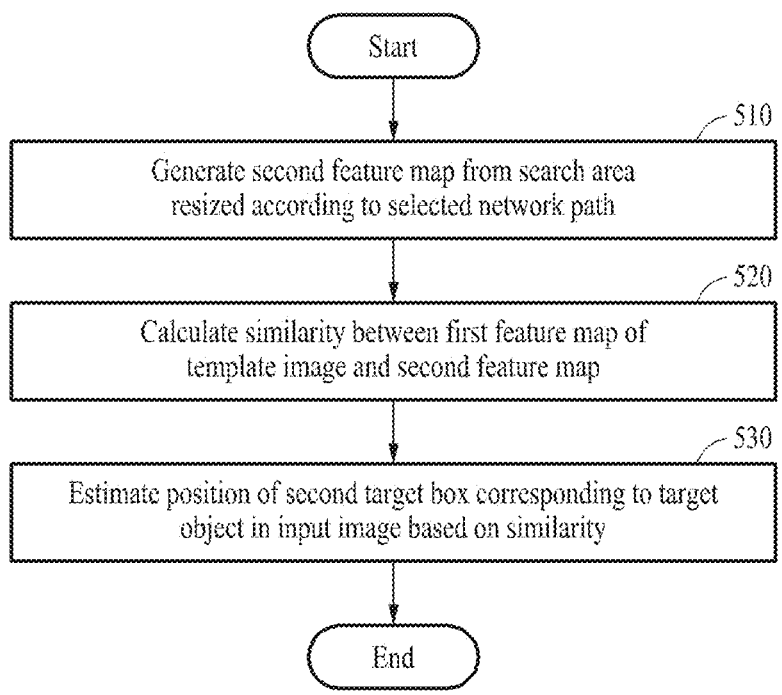
FIG. 5 illustrates an example of a method of tracking a target object.

FIG. 5 illustrates an example of a method of tracking a target object. Operations to be described hereinafter with reference to FIG. 5 may be performed sequentially, but not necessarily performed sequentially. For example, the order of the operations may be changed and at least two of the operations may be performed in parallel.

Referring to FIG. 5, an object tracking apparatus may track a target object through operations 510 through 530.

In operation 510, the object tracking apparatus may generate a second feature map from the search area resized according to the network path selected in operation 220. The object tracking apparatus may generate the second feature map from the resized search area using, for example, a neural network model sharing parameters and/or a feature extraction model according to the network path selected in operation 220.

In operation 520, the object tracking apparatus may determine a similarity between a first feature map of the template image and the second feature map generated in operation 510. In an example, the first feature map of the template image may be previously generated and stored.

For example, the template image may correspond to a partial area of a frame (hereinafter, referred to as the n-th frame) of a video, and an input image may correspond to a partial area of a frame subsequent to the frame (hereinafter, referred to as the (n+1)-th frame). In response to the target object being detected in the n-th frame, a target box corresponding to the target object ("the first target box") may be designated. A search area may be determined in the input image within the (n+1)-th frame based on the position and size of the template image within the n-th frame. The search area in the input image may be determined to be larger than the template image. The template image may include information on the target object and context information. The information on the target object may be included inside the first target box, and the context information may be included outside the first target box. The first feature map may include the information on the target object and the context information included in the template image.

In operation 520, the object tracking apparatus may determine a similarity between the first feature map of the template image and the second feature map. The object tracking apparatus may determine the similarity by comparing the first feature map with the second feature map. The object tracking apparatus may derive a cross correlation between the first feature map and the second feature map through, for example, a cross-correlation layer of a similarity determining network. Alternatively, the object tracking apparatus may determine the similarity using a transformer. The similarity determination result may indicate the information on the target object, and/or the position of the target object in the input image corresponding to the first feature map. The object tracking apparatus may display the similarity determination result, for example, in the form of a position of the search area corresponding to the input image, and/or a score of the search area.

In operation 530, the object tracking apparatus may estimate a position of a second target box corresponding to the target object in the input image based on the similarity determined in operation 520. The object tracking apparatus may track the target object by estimating the position of the second target box. The object tracking apparatus may estimate an area having a higher similarity determined in operation 520 than a predetermined criterion as the position of the second target box. The object tracking apparatus may track the target object based on position information of the second target box.

The object tracking apparatus may store the position of the second target box estimated in operation 530 to set a search area in an input image subsequent to the input image. In an example, the stored position of the second target box may be used as the position of the first target box in the template image for the subsequent input image.

Figure 6:
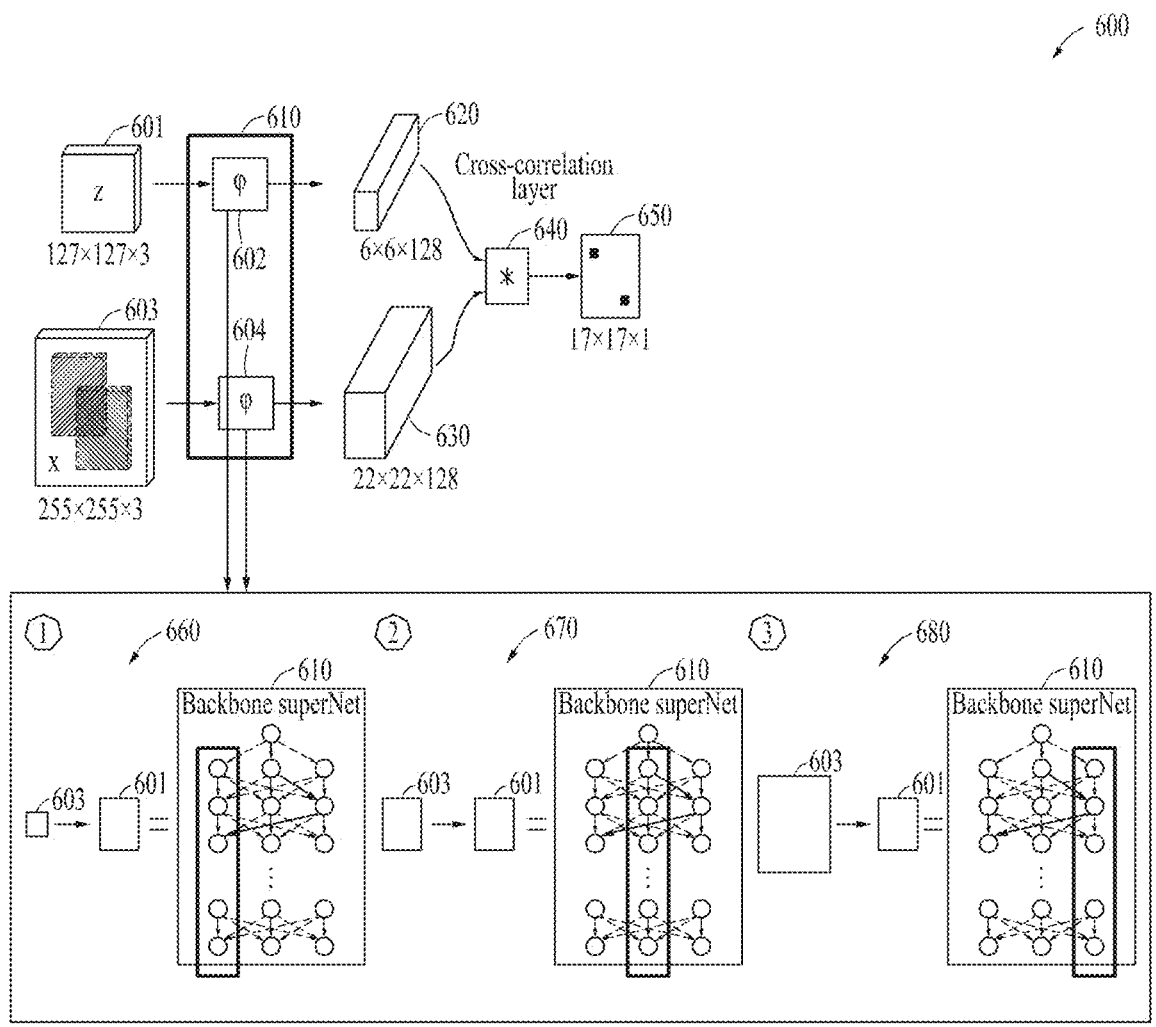
FIG. 6 illustrates an example of a process of tracking a target object.

FIG. 6 illustrates an example of tracking a target object. Referring to FIG. 6, a diagram 600 shows a network path selected from a plurality of network paths of a neural network model according to a resizing ratio between a template image z 601 and an input image x 603.

The template image 601 and the input image 603 may be obtained by cropping an area twice the size of a target object in a state in which a context area is additionally included in a box area surrounding the target object. At this time, to correspond to various shapes of target objects, an image may be cropped into a square or rectangular shape by a predetermined formula, regardless of the aspect ratio. Cropping an area twice the size of the target object as described above is because it may be difficult to separate the edge of an object and it is helpful to include the context area to improve tracking performance. By setting the size of the input image 603 to be larger than the size of the template image 601, a motion of the target object may be accounted for.

Due to the characteristics of deep learning that uses a fixed network, the sizes of images input to the network may be the same. The template image z 601 may have a fixed first size of an image input to the neural network model. The template image 601 may have a size of, for example, 127 (width)×127 (height)×3 (number of channels).

The input image x 603 may correspond to an image of a search area having a second size set based on the position of the first target box in the template image 601. The input image x 603 may have a size of, for example, 255 (width)×255 (height)×3 (number of channels).

The object tracking apparatus may crop the template image 601 including the area where the target object is present and context information based on, for example, the exact position and size information of the target object provided in a first image. The object tracking apparatus may extract first features 602 of the target object included in the template image 601 by passing the cropped template image 601 through a backbone Super Net. The object tracking apparatus may also crop, for an image that is subsequently input, a search area (the input image x 603) including context information near the position of the target object included in the first image, and then extract second features 604.

A neural network model 610 may generate a first feature map 620 based on the first features 602 corresponding to the template image z 601, and generate a second feature map 630 based on the second features 604 corresponding to the input image x 603. The first feature map 620 may have a size of, for example, 6 (width)×6 (height)×128 (channels). The second feature map 630 may have, for example, 22 (width)×22 (height)×128 (channels).

The neural network model 610 may extract the first features 602 and/or the second features 604 by selecting a network path from a plurality of network paths of the neural network model 610 according to a resizing ratio of the first size of the template image z 601 to the second size of the search area 603. The object tracking apparatus may generate the first feature map 620 by inputting the first features 602 into the selected network path, and may generate the second feature map 630 by inputting the second features 604 into the selected network path.

When the second size of the search area 603 is smaller than the first size of the template image z 601 as shown in a diagram 660, the neural network model 610 may select a network path having a kernel size of "3".

When the second size of the search area 603 is equal to the first size of the template image z 601 as shown in a diagram 670, the neural network model 610 may select a network path having a kernel size of "5".

When the second size of the search area 603 is larger than the first size of the template image z 601 as shown in a diagram 680, the neural network model 610 may select a network path having a kernel size of "7".

The object tracking apparatus may determine a similarity by comparing the first feature map 620 with the second feature map 630. The object tracking apparatus may determine the similarity by deriving a cross correlation between the first feature map 620 and the second feature map 630 through, for example, a cross-correlation layer 640. The object tracking apparatus may output a position 650 of a bounding box corresponding to the position of the target object in the search area 603, for example, in the form of coordinates, according to the similarity determination result.

Figure 7:
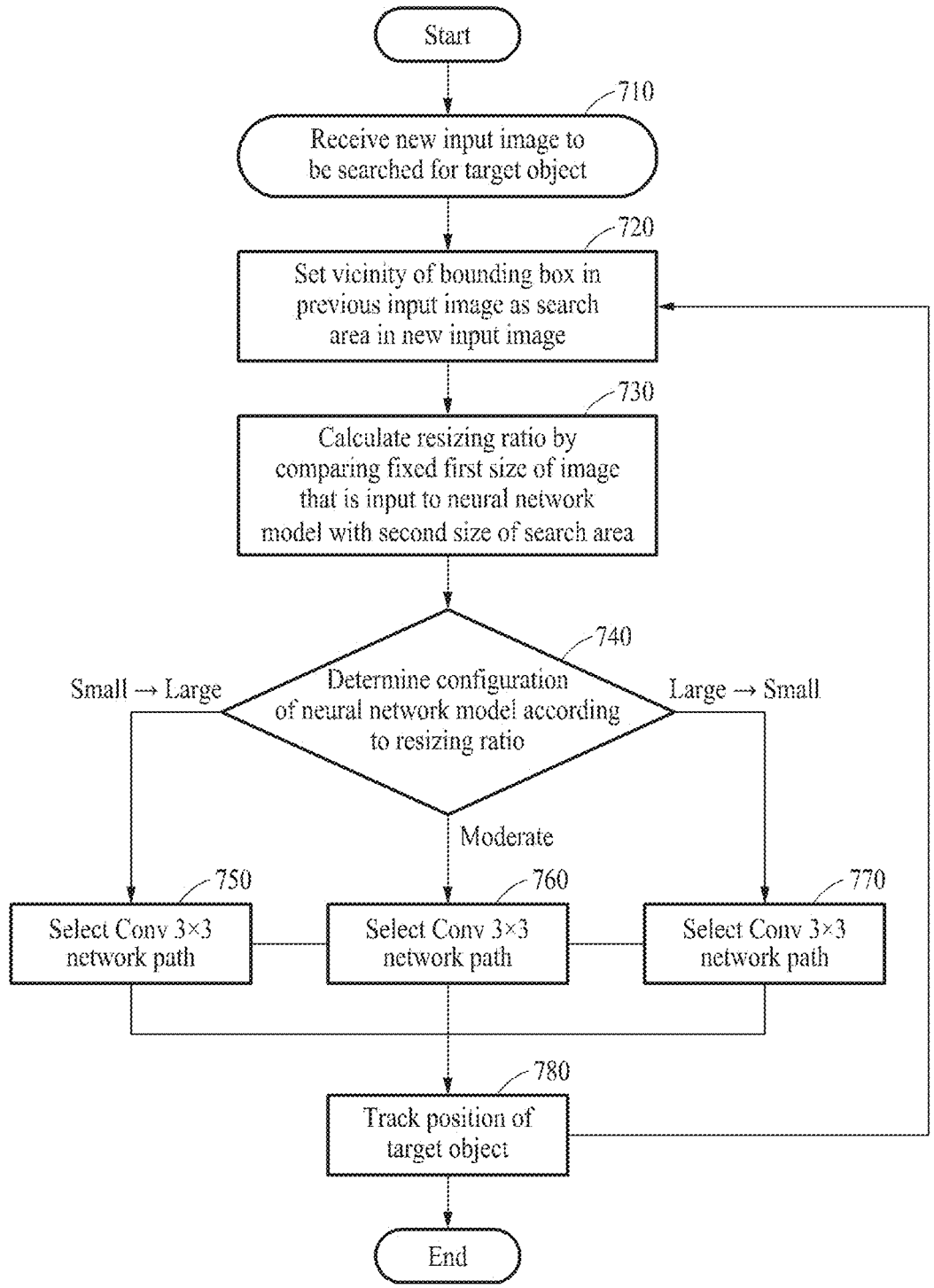
FIG. 7 illustrates an example of a method of tracking a target object.

FIG. 7 illustrates an example of a method of tracking a target object. Operations to be described hereinafter with reference to FIG. 7 may be performed sequentially, but not necessarily performed sequentially. For example, the order of the operations may be changed and at least two of the operations may be performed in parallel.

Referring to FIG. 7, an object tracking apparatus may track a position of a target object through operations 710 to 780.

In operation 710, the object tracking apparatus may receive a new input image to be searched for a target object.

In operation 720, the object tracking apparatus may set a vicinity of a bounding box (first target box) of a previous input image as a search area in the new input image received in operation 710. The object tracking apparatus may set an area twice the area of the first target box as the search area.

In operation 730, the object tracking apparatus may determine a resizing ratio by comparing a fixed size ("first size") of an image that is input to a neural network model with a size ("second size") of the search area set in operation 720. When the size of the image that is input to the neural network model is fixed, the object tracking apparatus may resize the search area from the second size to the first size and input the resized search area to the neural network model. Here, the resizing ratio may correspond to an image resizing ratio for converting the second size of the search area to the first size, which is the fixed size of the image that is input to the neural network model. The object tracking apparatus of one or more embodiments may improve the performance of tracking the target object by varying the configuration of a network path of the neural network model according to the resizing ratio.

In operation 740, the object tracking apparatus may determine a network configuration of the neural network model according to the resizing ratio determined in operation 730.

When the resizing ratio determined in operation 740 is to increase the second size of the search area to the first size of the image that is input to the neural network model, the object tracking apparatus may select a network path with a convolution kernel size of "3" of the neural network model (e.g., a Conv 3×3 network path), in operation 750. Here, the case where the resizing ratio is to increase the second size of the search area to the first size of the image that is input to the neural network model may correspond to a case where the resizing ratio is greater than a threshold value (e.g., "1").

When the resizing ratio determined in operation 740 is to maintain the second size of the search area to be equal to the first size of the image that is input to the neural network model, the object tracking apparatus may select a network path with a convolution kernel size of "5" of the neural network model (e.g., a Conv 5×5 network path), in operation 760. Here, the case where the resizing ratio is to maintain the second size of the search area to be equal to the first size of the image that is input to the neural network model may correspond to a case where the resizing ratio is equal to the threshold value (e.g., "1").

When the resizing ratio determined in operation 740 is to reduce the second size of the search area to the first size of the image that is input to the neural network model, the object tracking apparatus may select a network path with a convolution kernel size of "7" of the neural network model (e.g., a Conv 7×7 network path), in operation 770. Here, the case where the resizing ratio is to reduce the second size of the search area to the first size of the image that is input to the neural network model may correspond to a case where the resizing ratio is less than the threshold value (e.g., "1").

In operation 780, the object tracking apparatus may track the position of the target object by estimating a position of a target box ("second target box") corresponding to the target object in the new input image according to the network path selected in operation 750, 760, or 770 according to the network configuration determined in operation 740.

In operation 780, the object tracking apparatus may extract a second feature map corresponding to the search area according to the selected network path. The object tracking apparatus may estimate the position of the second target box corresponding to the target object by comparing a first feature map of a template image prepared in advance with the second feature map. The position of the second target box may be used to select a search area in a subsequent input image.

Figure 8:
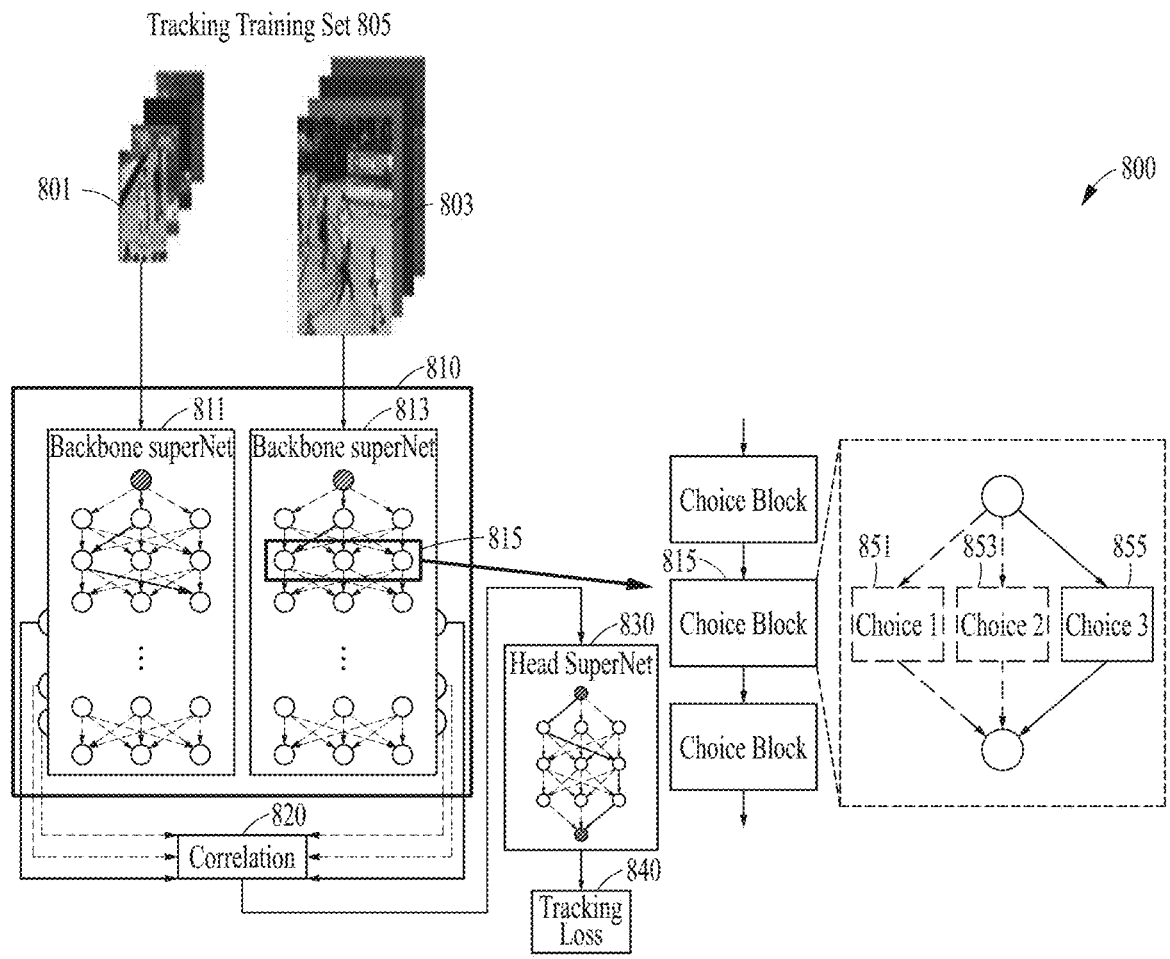
FIG. 8 illustrates an example of a process of training a neural network model for tracking a target object.

FIG. 8 illustrates an example of a process of training a neural network model for tracking a target object. Referring to FIG. 8, a diagram 800 shows a process of training a neural network model 810 using a training set 805 including a template image 801 and a search image 803.

The neural network model 810 may correspond to a tracker configured as a Backbone Super Net. The neural network model 810 may include a Siamese network. The Siamese network may have two identical networks 811 and 813 sharing weights. At this time, the two identical networks 811 and 813 may receive different input values, but may be joined by an energy function at the top. The energy function may also be called a "loss function" or a "cost function". The energy function may determine a final embedding value of each of the two identical networks 811 and 813, and parameters of the two identical networks 811 and 813 may be shared with each other. The Siamese network may be used to compare feature vectors of input values (e.g., the template image 801 and the search image 803) and find a similarity therebetween. The Siamese network may be trained to place embedding values that are in the category of the same classes or concepts, to be close to each other in a vector space. The Siamese network may correspond to a network designed for one-shot learning.

A training apparatus may train the neural network model 810 configured as a Super Net through, for example, single path one-shot neural architecture search. In an example, a horizontal line 815 of circular dots shown in the neural network model 810 may represent one choice block.

One choice block 815 may have several options, that is, a plurality of network paths (e.g., a first choice path (Choice 1) 851, a second choice path (Choice 2) 853, and a third choice path (Choice 3) 855. Here, the first choice path (Choice 1) 851, the second choice path (Choice 2) 853, and the third choice path (Choice 3) 855 may have different channel sizes. The plurality of network paths may include, for example, a total of three stages. In addition, the plurality of network paths may have 96 channels, 192 channels, and 384 channels, respectively, and the number of training iterations may be "3", "3", and "9".

During training, the training may be performed using one network path randomly selected from the plurality of network paths 851, 853, and 855. Here, the option to be used may correspond to a network path having a convolution kernel size of "3", "5", or "7".

Each of the plurality of network paths of the Backbone Super Net (e.g., the first choice path (Choice 1) 851, the second choice path (Choice 2) 853, and the third choice path (Choice 3) 855) may be configured as a ConvNext network block, for example. The ConvNext network block will be described below with reference to FIG. 9. Further, the portion corresponding to Box Prediction may be borrowed from the settings of the Transformer part of SwinTrack.

The training apparatus may, for example, vary the kernel size of each convolution operation to "3", "5", or "7" by applying the One-Shot NAS (Neural Architecture Search) technique, and then train the neural network model 810 for 300 epochs by randomly changing the kernel size.

The training apparatus may generate a correlation hit map 820 based on a correlation between feature maps respectively corresponding to the two identical networks 811 and 813 sharing weights.

The training apparatus may change to use one network path by applying the correlation hit map 820 to a head Super Net 830. The head Super Net 830 may correspond to, for example, a Multi-Layer Perceptron (MLP) network.

The training apparatus may train the neural network model 810 so that a tracking loss 840 output by the head Super Net 830 may be minimized.

The training apparatus may confirm performance improvement using the Super Net trained in the manner described above, during a path change test according to a resizing ratio.

The neural network model 810 trained in the manner described above may select a different network path according to the resizing ratio of an image during inference to track the target object.

The object tracking apparatus may select and use a different network path according to the resizing ratio of the search area in the input image using the neural network model 810 trained through the above process. For example, when the resizing ratio is greater than a first threshold value (e.g., 1.04), the object tracking apparatus may select a network path having a small kernel size (e.g., a network path having kernel sizes of "3", "3", and "3" of ConvNext Block $1^{st}$, $2^{nd}$, and $3^{rd}$ stages). When the resizing ratio is less than a second threshold value (e.g., 0.40), the object tracking apparatus may select a network path having a large kernel size (e.g., a network path having kernel sizes of "7", "5", and "3" of ConvNext Block $1^{st}$, $2^{nd}$, and $3^{rd}$ stages). When the resizing ratio is greater than the second threshold value and less than the first threshold value, the object tracking apparatus may select a network path having a large kernel size (e.g., a network path having kernel sizes of "5", "5", and "3" of ConvNext Block $1^{st}$, $2^{nd}$, and $3^{rd}$ stages) to track the target object.

Figure 9:
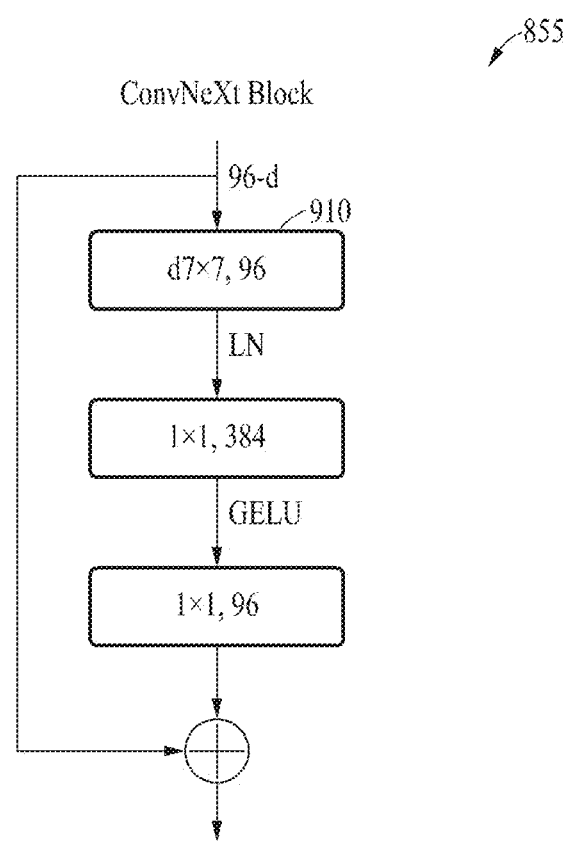
FIG. 9 illustrates an example of a block of a plurality of network paths.

FIG. 9 illustrates an example of a block of a plurality of network paths. Referring to FIG. 9, an example of a ConvNext network block 855 is shown.

The ConvNext network block 855 may correspond to an MLP block having a ResNet structure. In the ConvNeXt network block 855, d7×7 in a first block 910 may indicate a kernel size of 7×7. The kernel size in the first block 910 may be changed to a kernel size of 5×5 or a kernel size of 3×3.

In the ConvNext network block 855, the portion corresponding to Box Prediction may be borrowed from the settings of the Transformer part of SwinTrack. The ConvNext network block 855 may increase the number of channels four times, from "96" to "384", and then return it to the original number of channels "96". This is because 1×1 convolution eventually works the same as a fully connected layer.

Figure 10:
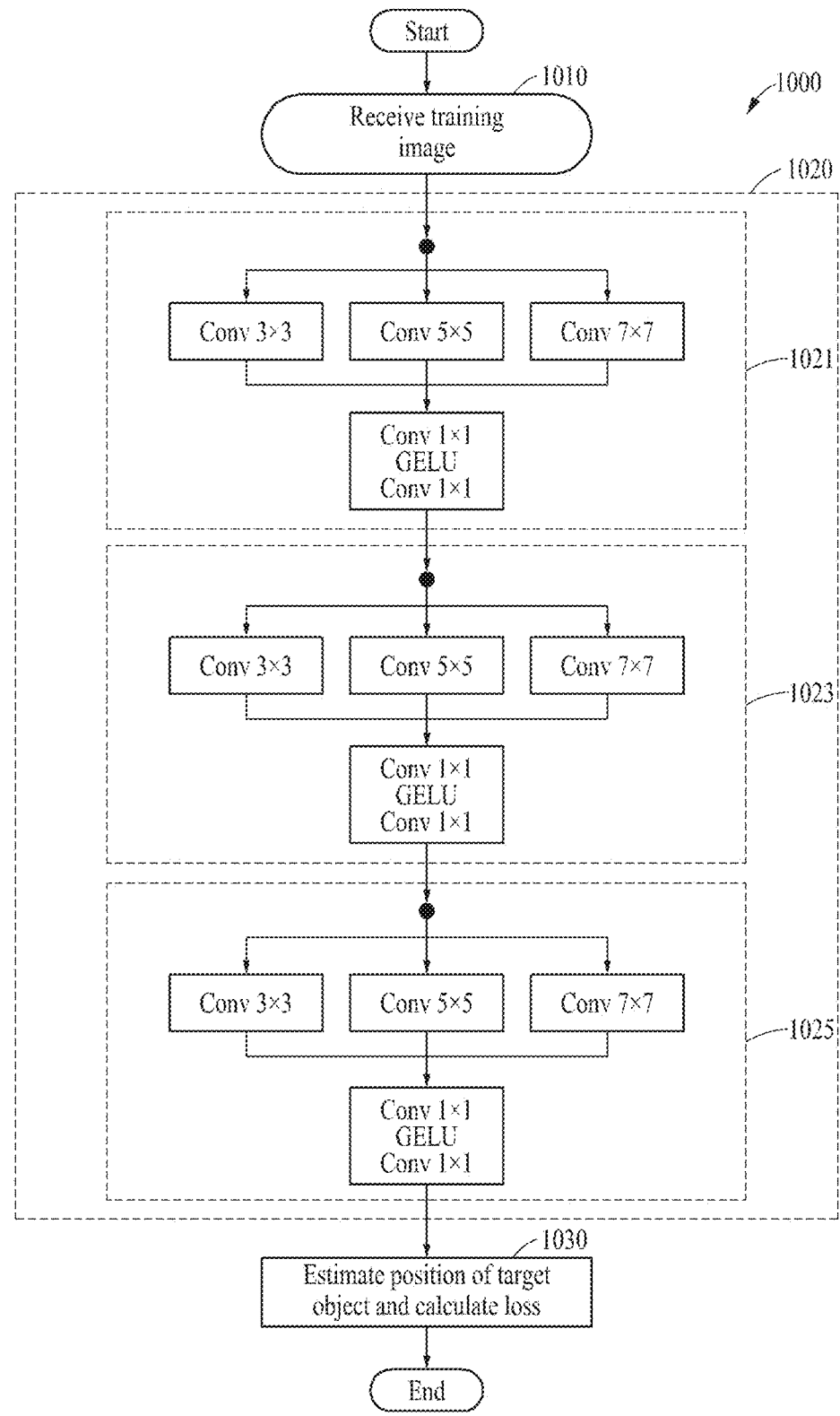
FIG. 10 illustrates an example of a training process.

FIG. 10 illustrates an example of a training process. Referring to FIG. 10, a diagram 1000 shows a process of training a neural network model. A training apparatus may estimate a position of a target object through operations 1010 to 1050.

In operation 1010, the training apparatus may receive a training image.

In operation 1020, the training apparatus may train a neural network model by applying the training image received in operation 1010 to three stages 1021, 1023, and 1025 of a plurality of network paths. The training apparatus may train the neural network model by one-shot approach of Neural Architecture Search (NAS). The one-shot approach may be a method of configuring network paths having multiple options per operation or layer and training a neural network model by selecting one option, that is, only one network path, from the multiple options.

In operation 1020, features of the training image passing through the first stage 1021 may be transmitted to the second stage 1023, and the features passing through the second stage 1023 may be transmitted to the third stage 1025. The first stage 1021 may have "96" channels, the second stage 1023 may have "192" channels, and the third stage 1025 may have "384" channels. In addition, the number of training iterations in the first stage 1021 may be "3", the number of training iterations in the second stage 1023 may be "3", and the number of training iterations in the third stage 1025 may be "9".

In operation 1020, the training apparatus may train the neural network model by selecting only one network path from different network paths included in each stage. The training apparatus may select a network path at random at each input of data, and then proceed with training the neural network model by performing backward propagation through the same network path as that of forward propagation. As training is completed, the entire network may be evenly trained, and the neural network model completed as described above may be called a "Super Net".

In operation 1030, the training apparatus may estimate the position of the target object using the neural network model trained in operation 1020, and train the neural network model based on a loss between an estimation result and a ground truth (the actual position of the target object).

Figure 11:
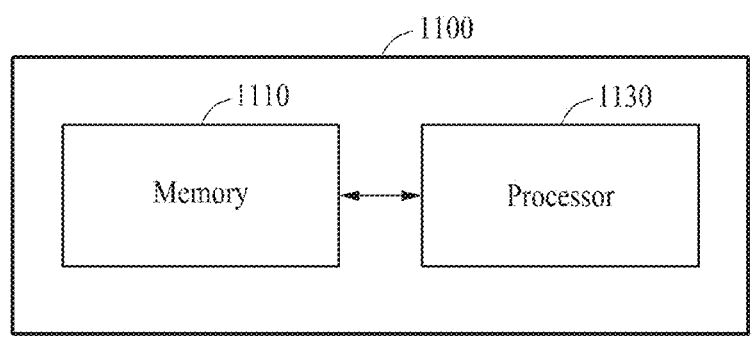
FIG. 11 illustrates an example of an apparatus with target object tracking.

FIG. 11 illustrates an example of an apparatus with target object tracking. Referring to FIG. 11, an object tracking apparatus 1100 includes a memory 1110 (e.g., one or more memories) and a processor 1130 (e.g., one or more processors).

The memory 1110 may store at least one of a template image, a position of a first target box in the template image, or a first feature map of the template image. The memory 1110 may also store a neural network model. The memory 1110 may store at least one program and/or a variety of information generated in a processing process of the processor 1130. The memory 1110 may store, for example, a network path selected by the processor 1130, a position of a second target box estimated by the processor 1130, and/or a tracked position of the target object. However, examples are not necessarily limited thereto.

In addition, the memory 1110 may store a variety of data and programs. The memory 1110 may include a volatile memory or a non-volatile memory. The memory 1110 may include a high-capacity storage medium such as a hard disk to store a variety of data.

The processor 1130 sets a search area for a target object included in an input image based on a position of a first target box. The processor 1130 selects a network path from a plurality of network paths of a neural network model according to a resizing ratio of a first size of an image that is input to the neural network model to a second size of the search area. Here, the neural network model may be, for example, a deep neural network (DNN) or a recurrent neural network (RNN), but is not necessarily limited thereto. The processor 1130 tracks the target object by estimating a position of a second target box corresponding to the target object in the input image based on the selected network path.

The processor 1130 may determine the resizing ratio based on a value obtained by dividing the first size of the image that is input to the neural network model by the second size of the search area. The processor 1130 may select a network path determined according to the resizing ratio from the plurality of network paths, according to a result of comparison between the resizing ratio and a set threshold value. The plurality of network paths may include blocks configured as convolutional layers respectively corresponding to different kernel sizes.

The processor 1130 may execute the program and control the object tracking apparatus 1100. Program codes to be executed by the processor 1130 may be stored in the memory 1110. For example, the memory 1110 may include a non-transitory computer-readable storage medium storing instructions that, when executed by the processor 1130, configure the processor 1130 to perform any one, any combination, or all of the operations and methods described herein with reference to FIGS. 1-12.

In addition, the processor 1130 may perform a technique corresponding to the at least one method described with reference to FIGS. 1 to 10. The processor 1130 may be, for example, a mobile application processor (AP), but is not necessarily limited thereto. Alternatively, the processor 1130 may be an object tracking apparatus implemented by hardware including a circuit having a physical structure to perform desired operations. The desired operations may include, for example, codes or instructions included in a program. The hardware-implemented object tracking apparatus 1100 may include, for example, a microprocessor, a central processing super sampling unit (CPU), a graphics processing super sampling unit (GPU), a processor core, a multi-core processor, a multiprocessor, an application-specific integrated circuit (ASIC), a field-programmable gate array (FPGA), and a neural processing unit (NPU).

Figure 12:
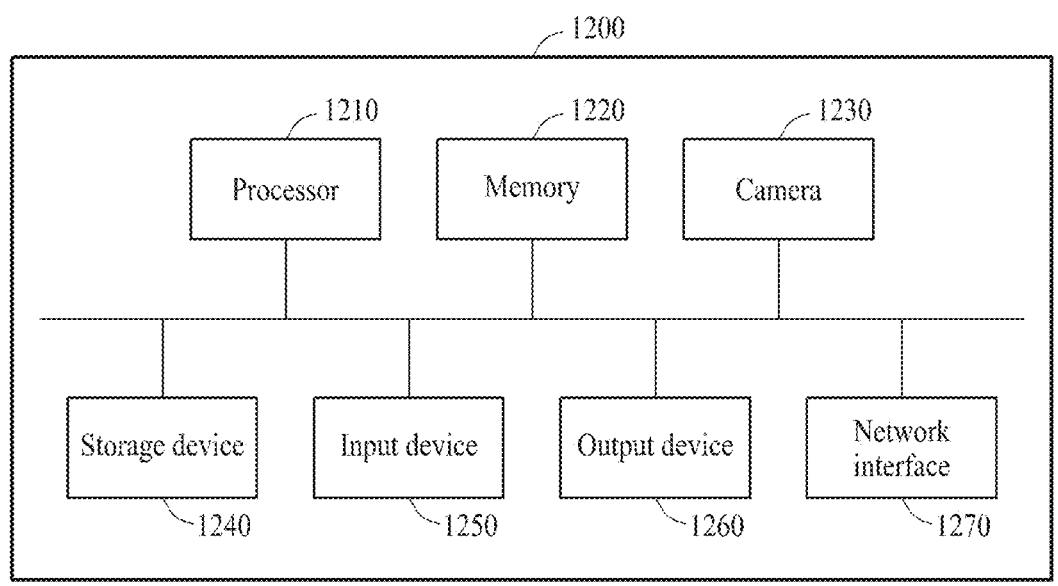
FIG. 12 illustrates an example of an electronic device for tracking a target object.

FIG. 12 illustrates an example of an electronic device for tracking a target object. Referring to FIG. 12, an electronic device 1200 may include a processor 1210 (e.g., one or more processors), a memory 1220 (e.g., one or more memories), a camera 1230, a storage device 1240, an input device 1250, an output device 1260, and a network interface 1270 that may be connected to each other through a communication bus 1280. The electronic device 1200 may be or include the object tracking apparatus 1100 of FIG. 11, in an example.

For example, the electronic device 1200 may be implemented as at least a part of a mobile device such as a mobile phone, a smart phone, a PDA, a netbook, a tablet computer or a laptop computer, a wearable device such as a smart watch, a smart band or smart glasses, a computing device such as a desktop or a server, a home appliance such as a television, a smart television or a refrigerator, a security device such as a door lock or a closed-circuit television (CCTV), or a means of transportation such as an autonomous vehicle, a smart vehicle, or a drone. The electronic device 1200 may structurally and/or functionally include the object tracking apparatus 100 of FIG. 1 and/or the object tracking apparatus 1100 of FIG. 11.

The processor 1210 sets a search area for a target object included in an input image based on a position of a first target box in a template image. The processor 1210 selects a network path from a plurality of network paths of a neural network model according to a resizing ratio of a first size of an image that is input to the neural network model to a second size of the search area. The processor 1210 may perform at least one operation of auto focusing or auto zooming on the target object by estimating a position of a second target box corresponding to the target object in the input image by resizing the search area according to the selected network path. The processor 1210 may determine the resizing ratio between the first size and the second size. The processor 1210 may select a network path determined according to the resizing ratio from the plurality of network paths, according to a result of comparison between the resizing ratio and a set threshold value. The processor 1210 may select a first network path corresponding to a first kernel size, in response to the resizing ratio being greater than the threshold value. The processor 1210 may select a second network path corresponding to a second kernel size larger than the first kernel size, in response to the resizing ratio being equal to the threshold value. The processor 1210 may select a third network path corresponding to a third kernel size larger than the second kernel size, in response to the resizing ratio being less than the threshold value.

The processor 1210 executes instructions or functions to be executed in the electronic device 1200. For example, the processor 1210 may process the instructions stored in the memory 1220 or the storage device 1240. The processor 1210 may perform the operations described through FIGS. 1 to 11. For example, the memory 1220 may include a non-transitory computer-readable storage medium storing instructions that, when executed by the processor 1210, configure the processor 1210 to perform any one, any combination, or all of the operations and methods described herein with reference to FIGS. 1-12.

The memory 1220 may include a computer-readable storage medium or a computer-readable storage device. The memory 1220 may store instructions to be executed by the processor 1210 and may store related information while software and/or an application is executed by the electronic device 1200.

The camera 1230 may capture a photo and/or a video. For example, the camera 1230 may capture or generate at least one of a template image or an input image.

The storage device 1240 includes a computer-readable storage medium or computer-readable storage device. The storage device 1240 may store a more quantity of information than the memory 1220 for a long time. For example, the storage device 1240 may include a magnetic hard disk, an optical disc, a flash memory, a floppy disk, or other non-volatile memories known in the art.

The input device 1250 may receive an input from the user in traditional input manners through a keyboard and a mouse, and in new input manners such as a touch input, a voice input, and an image input. For example, the input device 1250 may include a keyboard, a mouse, a touch screen, a microphone, or any other device that detects the input from the user and transmits the detected input to the electronic device 1200.

The output device 1260 may provide an output of the electronic device 1200 to the user through a visual, auditory, or haptic channel. The output device 1260 may include, for example, a display, a touch screen, a speaker, a vibration generator, or any other device that provides the output to the user.

The network interface 1270 may communicate with an external device through a wired or wireless network.

The object tracking apparatuses, memories, processors, electronic devices, cameras, storage devices, input devices, output devices, communication buses, object tracking apparatus 100, object tracking apparatus 1100, memory 1110, processor 1130, electronic device 1200, processor 1210, memory 1220, camera 1230, storage device 1240, input device 1250, output device 1260, communication bus 1280, and other apparatuses, devices, units, modules, and components disclosed and described herein with respect to FIGS. 1-12 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RW, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method with target object tracking, the method comprising:
   setting a search area for a target object included in an input image based on a position of a first target box in a template image;
   selecting a network path from a plurality of network paths of a neural network model according to a result of a comparison between a resizing ratio and a predetermined threshold value, the resizing ratio corresponding to a ratio of a size of another image that is input to the neural network model to a size of the search area; and
   tracking the target object by estimating a position of a second target box corresponding to the target object in the input image according to the selected network path.

2. The method of claim 1, wherein the selecting of the network path comprises:
   determining the resizing ratio based on a value obtained by dividing the size of the other image by the size of the search area; and
   selecting a network path determined according to the resizing ratio from the plurality of network paths, according to a result of a comparison between the resizing ratio and a set threshold value.

3. The method of claim 2, wherein the plurality of network paths comprise blocks configured as convolutional layers respectively corresponding to different kernel sizes.

4. The method of claim 2, wherein the selecting of the network path determined according to the resizing ratio comprises:
   selecting a first network path corresponding to a first kernel size, in response to a determination that the resizing ratio is greater than the threshold value;
   selecting a second network path corresponding to a second kernel size, in response to a determination that the resizing ratio is equal to the threshold value; and
   selecting a third network path corresponding to a third kernel size, in response to the resizing ratio being less than the threshold value.

5. The method of claim 4, wherein
   the second kernel size is larger than the first kernel size, and
   the third kernel size is larger than the second kernel size.

6. The method of claim 1, wherein the neural network model comprises a Super Net having separate convolutional layers configured for a plurality of kernel sizes.

7. The method of claim 1, wherein the tracking of the target object comprises:
   generating a second feature map from the search area resized according to the selected network path; and
   estimating the position of the second target box corresponding to the target object in the input image using a first feature map of the template image and the second feature map.

8. The method of claim 7, wherein the estimating of the position of the second target box comprises:
   determining a similarity between the first feature map and the second feature map; and
   estimating the position of the second target box corresponding to the target object in the input image based on the similarity.

9. The method of claim 1, further comprising storing the position of the second target box to set the search area in an input image subsequent to the input image.

10. A non-transitory computer-readable storage medium storing instructions that, when executed by one or more processors, configure the one or more processors to perform the method of claim 1.

11. An apparatus with target object tracking, the apparatus comprising:
    one or more processors configured to:
        set a search area for a target object included in an input image based on the position of the first target box;
        select a network path from a plurality of network paths of a neural network model according to a result of a comparison between a resizing ratio and a predetermined threshold value, the resizing ratio corresponding to a ratio of a size of another image that is input to the neural network model to a size of the search area; and
        track the target object by estimating a position of a second target box corresponding to the target object in the input image based on the selected network path.

12. The apparatus of claim 11, wherein, for the selecting of the network path, the one or more processors are further configured to:
    determine the resizing ratio based on a value obtained by dividing the size of the other image by the size of the search area; and
    select a network path determined according to the resizing ratio from the plurality of network paths, according to a result of a comparison between the resizing ratio and a set threshold value.

13. The apparatus of claim 12, wherein the plurality of network paths comprise blocks configured as convolutional layers respectively corresponding to different kernel sizes.

14. The apparatus of claim 12, wherein, for the selecting of the network path determined according to the resizing ratio, the one or more processors are further configured to:
    select a first network path corresponding to a first kernel size, in response to the resizing ratio being greater than the threshold value;
    select a second network path corresponding to a second kernel size, in response to the resizing ratio being equal to the threshold value; and
    select a third network path corresponding to a third kernel size, in response to the resizing ratio being less than the threshold value.

15. The apparatus of claim 14, wherein
    the second kernel size is larger than the first kernel size, and
    the third kernel size is larger than the second kernel size.

16. The apparatus of claim 11, wherein the neural network model comprises a Super Net having separate convolutional layers configured for a plurality of kernel sizes.

17. The apparatus of claim 11, wherein, for the tracking of the target object, the one or more processors are further configured to:
- generate a second feature map from the search area resized according to the selected network path; and
- estimate the position of the second target box corresponding to the target object in the input image using the first feature map and the second feature map.

18. An electronic device, comprising:
- a camera configured to capture either one or both of a template image and an input image; and
- one or more processors configured to:
  - set a search area for a target object included in the input image based on a position of a first target box in the template image;
  - select a network path from a plurality of network paths of a neural network model according to a result of a comparison between a resizing ratio and a predetermined threshold value, the resizing ratio corresponding to a ratio of a size of another image that is input to the neural network model to a size of the search area; and
  - perform either one or both of auto focusing and auto zooming on the target object by estimating a position of a second target box corresponding to the target object in the input image by resizing the search area according to the selected network path.

19. The electronic device of claim 18, wherein, for the selecting of the network path, the one or more processors are further configured to:
- determine the resizing ratio between the size of the other image and the size of the search area; and
- select a network path determined according to the resizing ratio from the plurality of network paths, according to a result of a comparison between the resizing ratio and a set threshold value.

20. The electronic device of claim 19, wherein, for the selecting of the network path determined according to the resizing ratio, the one or more processors are further configured to:
- select a first network path corresponding to a first kernel size, in response to the resizing ratio being greater than the threshold value;
- select a second network path corresponding to a second kernel size larger than the first kernel size, in response to the resizing ratio being equal to the threshold value; and
- select a third network path corresponding to a third kernel size larger than the second kernel size, in response to the resizing ratio being less than the threshold value.

* * * * *